Feb. 25, 1936.     R. L. CLAUSE     2,032,003

METHOD OF MAKING A DOUBLE GLAZED UNIT

Filed Nov. 3, 1934

INVENTOR.
ROBERT L. CLAUSE
BY
ATTORNEYS.

Patented Feb. 25, 1936

2,032,003

UNITED STATES PATENT OFFICE 2,032,003

METHOD OF MAKING A DOUBLE GLAZED UNIT

Robert L. Clause, Sewickley, Pa., assignor to Pittsburgh Plate Glass Company, a corporation of Pennsylvania Application November 3, 1934, Serial No. 751,385

3 Claims. (Cl. 49—81)

Figure 1:
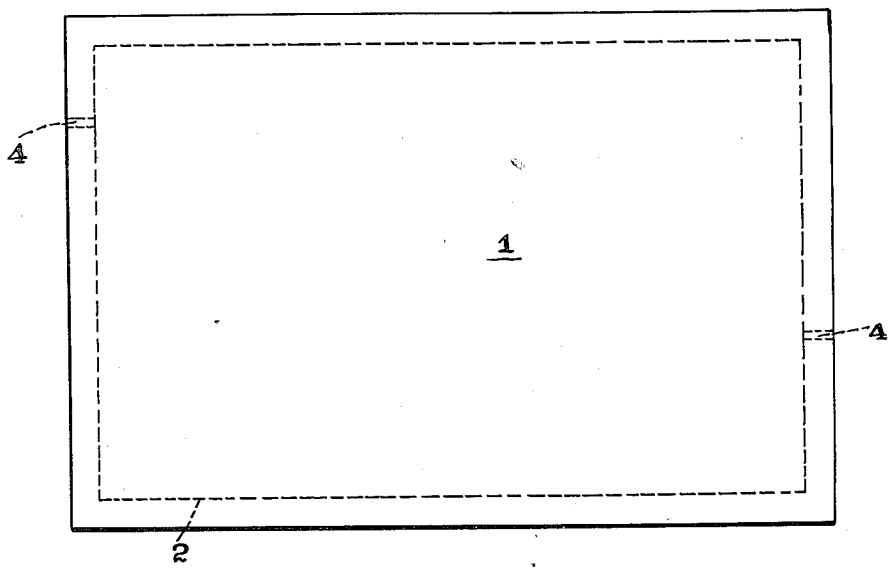
Figure 2:
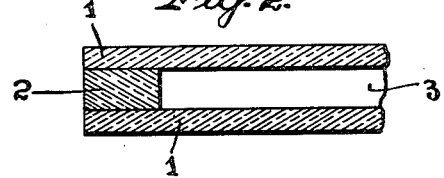

The invention relates to a double glazing unit and has for its principal objects the provision of a method of making the same in a practical way at relatively low cost and in such manner that the glass sheets are maintained in parallelism. Certain embodiments of the invention are illustrated in the accompanying drawing, wherein:

Figure 1 is a plan view of the unit. Fig. 2 is an enlarged section through one edge of the unit. And Figs. 3 and 4 are sections similar to Fig. 2 illustrating modifications.

Referring to the drawing, 1, 1 are a pair of glass sheets, either plate or window glass, and 2 is a spacer, also of glass, whose thickness governs the width of the air space 3. The sheets 1, 1 are of ordinary glass composition preferably containing, however, a small percentage of potassium oxide in order to prevent the subsequent development of efflorescence on the inner surfaces of the sheets. The spacer 3 is of a glass composition having a lower melting point than the glass sheets, such as a lead glass having a softening point in the neighborhood of 950 to 1000 deg. F. When the assembled unit is exposed to a temperature which will soften the spacer, but not sufficient to soften the sheets, the spacer will weld or fuse to the glass sheets, thus forming an integral unit without any sagging of the upper sheets 1. This operation may be carried out to advantage in a roller leer or kiln through which the units are carried, such leer being heated to give a gradually increasing temperature to soften the spacer, after which the temperature decreases until the articles emerge from the leer at handling temperature. To take care of pressure changes in the space 3 which would tend to collapse the sheets if a complete seal were made while the air was at a high temperature, provision is made for insuring communication of the air space with the outer air after the seal is made. This result may be accomplished by the provision of suitable perforations 4 (Fig. 1) through the spacers. Any tendency of the perforations to close when the unit is heated can be taken care of by inserting tubes of clay or other suitable refractory material in the perforations. After the operation is completed, the space 3 is filled with dehydrated air, and the perforations 4 are sealed.

Figure 3:
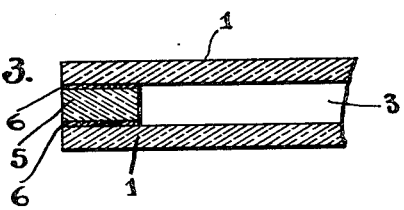

Fig. 3 illustrates a modification in which the spacer 5 is of glass having the same composition as the glass sheets, but having its faces coated with layers 6 of ceramic glaze or other glass composition having a melting point well below the softening point of the sheets and spacer. The procedure followed in securing the welding action is as heretofore described, or the edges only of the unit may be brought up to the temperature required by the use of electric resistance elements in parallel with and above and below such edges out of contact therewith which are heated to the necessary temperature. The production of the unit of Fig. 3 has the advantage that the spacing between the sheets is positively maintained without the precision required as to temperature control which the first construction requires, since with such first construction, care must be exercised to prevent the spacer from becoming too hot so that it will thin and thus narrow the air space.

Figure 4:
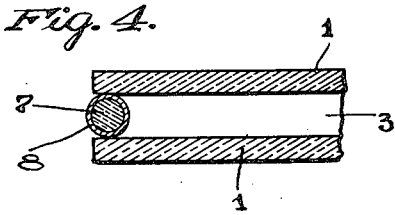

Fig. 4 illustrates a modification of the construction of Fig. 3 in that a rod 7 of circular cross section is used as a spacer, such spacer having a coating 8 of vitreous material having a relatively low melting point. It is also feasible to use a spacer of this same circular cross section in the construction of Figs. 1 and 2.

What I claim is:

1. A method of making a double glazing unit, which consists in assembling a pair of glass sheets in parallel with a glass spacing strip between the edges thereof having its surfaces of a composition which will soften at a temperature substantially below the softening temperature of the glass sheets, and heating the unit until said surfaces are softened and adhere to the glass sheets, the degree of heat applied being less than that required to soften the glass sheets.

2. A method of making a double glazing unit, which consists in assembling a pair of glass sheets in parallel with a glass spacing strip between the edges thereof having its surfaces of a composition which will soften at a temperature substantially below the softening temperature of the glass sheets, and heating the unit until said surfaces are softened and adhere to the glass sheets, communication being maintained during the heating operation between the space between the sheets and the atmosphere, and the degree of heat applied being less than that required to soften the glass sheets.

3. A method of making a double glazing unit which consists in assembling a pair of glass sheets in parallel with a glass spacing strip between the edges thereof having its body portion of a composition which softens at about the same temperature as the glass sheets and its surfaces of a composition which will soften at a temperature substantially lower than the softening temperature of the body portion, and heating the unit until said surfaces soften and adhere to the glass sheets, the degree of heat applied being less than that required to soften the glass sheets.

R. L. CLAUSE.